3,083,241
PROCESS FOR THE MANUFACTURE OF CARBON TETRACHLORIDE

Oskar Glemser, Gottingen, Germany, assignor to Farbwerke Hoechst Aktiengesellschaft vormals Meister Lucius & Brüning, Frankfurt am Main, Germany, a corporation of Germany
No Drawing. Filed July 21, 1960, Ser. No. 44,291
Claims priority, application Germany July 31, 1959
6 Claims. (Cl. 260—664)

The present invention relates to a process for the manufacture of carbon tetrachloride.

Various attempts have already been made to prepare carbon tetrachloride according to the following equation:

$$2COCl_2 = CO_2 + CCl_4 \qquad (1)$$

Stock, for example, reported on the decomposition of phosgene according to the above equation in "Zeitschrift für anorganische allgemeine Chemie," volume 147, page 245 (1925); volume 195, page 140 (1931). Stock reported that the inhibition of the reaction cannot be suppressed by means of catalysts in favor of a carbon tetrachloride formation. Nor were Fink and Bonilla (J. Phys. Chem., volume 37, page 1135 (1933)) successful. Fink and Bonilla reported that carbon tetrachloride cannot be obtained by passing phosgene over active carbon nor over active carbon prepared with nickel, copper, cobalt, iron-(III) or chromium sulfate.

Haszeldine and Iserson (J. Americ. Chem. Soc., volume 79, page 5801 (1957)) described the preparation of carbon tetrachloride according to the above equation, wherein phosgene or a stoichiometric mixture of carbon monoxide and chlorine is reacted under superatmospheric pressure with $PCl_3$ or $PCl_5$ in the presence of active carbon impregnated with iron or nickel halides. This known process involves the disadvantage that phosgene is treated under superatmospheic pressure and that the process is carried out in discontinuous manner. In addition thereto, the active carbon retains carbon tetrachloride in a discontinuous process. A further disadvantage involved in that process is that the reaction product obtained still contains phosphorus compounds after distillation unless the product is washed. A further disadvantage involved in that process resides in the fact that the resulting reaction product includes volatile constituents which are not products that form according to Equation 1 above. Another known process (cf. German Auslegeschrift 1,048,896) implies similar disadvantages. In that latter process, phosgene is treated under a pressure within the range of between 30 atmospheres and 500 atmospheres at a temperature within the range of 300 and 600° C. using Friedel Crafts chloride catalysts ($FeCl_3$, $AlCl_3$, $BiCl_3$). In this latter reaction, the conversion rates obtained are as high as about 80%, but the reaction proceeds so slowly that it cannot be used for industrial purposes. Moreover, the carbon tetrachloride formed is removed from the reaction product by fractional distillation under a pressure above one atmosphere. Furthermore, it is disadvantageous to discontinuously treat phosgene under pressure.

The present invention is concerned with a process for making carbon tetrachloride from phosgene wherein phosgene and catalysts are permitted to react with one another while avoiding the disadvantages involved in the known processes described above.

In the process of this invention the catalyst used is active carbon which besides transition metals of groups V–VIII of the periodic table also contains at least one carbide of a transition metal of groups IV and V of the periodic table, of boron and silicon. The reaction is advantageously carried out at a temperature within the range of between about 250° C. and about 600° C. The use of stable carbides has proved especially advantageous. In some instances, it has proved advisable to add carbon disulfide and/or sulfur chloride in vapor form at a temperature of about 375–400° C. before or upon starting the reaction, which ensures that the reaction is in fact initiated.

As carbides there may be used more especially, for example, those of boron, silicon, titanium, zirconium, niobium, tantalum or vanadium, which may be used alone or in admixture with one another.

The proportion of carbide contained in the catalyst may vary within wide limits. It has been found that relatively small amounts of carbide are already active. Thus, for example, it has proved advantageous to use catalysts which contain about 3 grams to about 40 grams carbide per 200 grams active carbon.

Those transition metals of groups V–VIII of the periodic table which may appear in various valences are especially advantageous. There may be used more especially, for example, vanadium, molybdenum and tungsten, which may be employed alone or in admixture with one another and in various quantitative ratios.

In some cases, it may be advantageous to subject the catalyst to a chlorine treatment, preferably with cooling, before starting the reaction, i.e. before contacting the catalyst with phosgene, a mixture of phosgene with nitrogen, carbon monoxide and chlorine, or a mixture of carbon monoxide and chlorine which is used instead of preformed phosgene, or, respectively, before the supply of carbon disulfide and/or sulfur chloride.

In carrying out the process of this invention phosgene as such may be used as the starting gas; alternatively, mixtures of phosgene with other gases, such as nitrogen, carbon monoxide and chlorine, may be used. Instead of using preformed phosgene a mixture of carbon monoxide and chlorine may be employed, the components of said mixture being preferably used in stoichiometric amounts, i.e. a mixture of 72% by weight chlorine and 28% by weight carbon monoxide.

As stated above, the process of this invention is advantageously carried out at a temperature within the range of between about 250° C. and about 600° C. The temperatures which are most advantageous in a given case depend primarily on the nature and composition of the catalyst employed. When a catalyst containing tungsten is used, those temperatures are, for example, between about 400° C. and about 550° C., and when a catalyst containing molybdenum is used, those temperatures are within the range of between about 300° C. and about 450° C.

The process of this invention may be carried out in various ways. Thus, for example, the gas used as starting material may be passed over or through the catalyst. The invention may also be realized as a suspension process, wherein the starting gas is used for fluidizing the catalyst and maintaining it in suspension, the reaction taking place with formation of carbon tetrachloride, which is removed from the issuing gases in a manner known to the art.

The rate at which the gases used in accordance with this invention are passed over or through the substances used as catalyst may vary and may be within the range, for example, of between about 0.1 liter and about 10 liters per hour. The preferred rate is between about 0.4 liter and about 1 liter per hour.

The catalyst used for carrying out the process of this invention may be prepared in various ways, for example, by admixing active carbon, which has been impregnated with the respective transition metals of groups V–VIII of the periodic table or a reduced compound of these transition metals with the respective fine-powdered carbide and then intensely mixing the two components with one another. When very stable carbides are used, for example, boron carbide, it is advantageous to initially add those carbides in finely distributed form to the metal compound, which is subsequently reduced to metal. In this manner, the individual constituents of the catalyst are intensely mixed with one another.

The process of this invention offers the special advantage that it can be carried out continuously under atmospheric pressure, carbon tetrachloride being obtained in a yield as high as 60%, calculated on the phosgene used as starting material while the remaining phosgene leaves the reactor undecomposed and can again be passed over the catalyst to undergo reaction.

The process of this invention offers the further advantage that substantially the whole quantity of chlorine used in the form of phosgene or a carbon monoxide-chlorine mixture is obtained as carbon tetrachloride. In the known processes for making carbon tetrachloride by chlorinating methane, only half the amount of chlorine used is converted into carbon tetrachloride, while the other half is obtained as hydrogen chloride which is difficult to utilize and renders this known process little economic.

The process of this invention for making carbon tetrachloride from a mixture of carbon monoxide and chlorine is especially advantageous for the reason that apart from the total amount of chlorine used being converted into carbon tetrachloride the carbon monoxide required can be produced in economical manner from readily available raw materials.

From the resulting reaction product pure carbon tetrachloride can be obtained without difficulty by fractional distillation.

The following examples serve to illustrate the invention, but they are not intended to limit it thereto:

*Example 1*

200 grams active carbon having a grain size of 0.7–1.7 mm. were mixed with 4 grams boron carbide powder and then thoroughly wetted with a saturated aqueous solution of 100 grams ammonium molybdate

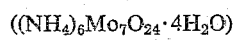

$$((NH_4)_6Mo_7O_{24}\cdot 4H_2O)$$

The mixture was heated for 6 hours at 120° C. and then reduced for about 5 hours at 500–800° C. in a slow current of hydrogen. The temperature was gradually raised to 950–1000° C. and the metal compound was reduced to metal until traces of water did no longer appear at the end of the furnace. In a current of hydrogen, the temperature was reduced down to room temperature and chlorine was passed over the active carbon, while the reaction mass was cooled, until no more chlorine was absorbed. When the chlorination was complete, the reaction space was heated to 370–380° C. and 6 grams carbon disulfide in vapor form were passed over the catalyst in order to rapidly initiate the reaction. Subsequently, phosgene was introduced. Phosgene was introduced at a rate of flow of 0.348 l./h.; the experiment was carried out for a period of 43 hours and 15 minutes. The yield of carbon tetrachloride was 52%, calculated on phosgene. The remaining 48% phosgene left the reaction space undecomposed and could again be used for reaction.

*Example 2*

300 grams active carbon having a grain size of 1.8 mm. to 2.8 mm. were impregnated with an almost saturated solution of 186.9 grams $WO_3$ in concentrated aqueous ammonia. The impregnated active carbon was heated for 6 hours at 125° C. and the metal compound was reduced first for 8 hours at 800° C. and then for 4 hours at 1070° C. in a current of hydrogen. The whole was allowed to cool in said current of hydrogen and 20 grams boron carbide powder were added to the cooled active carbon. Chlorination was carried out at room temperature until no more chlorine was absorbed by the catalyst. In order to initiate the reaction, carbon disulfide in vapor form was added in the manner described in Example 1 and phosgene was then introduced. The phosgene was introduced at a rate of flow of 0.935 l./h. for a period of 40 hours and at a temperature of 500° C. Carbon tetrachloride was obtained in a yield of 59.8%, calculated on phosgene, while the remaining phosgene left the reaction space undecomposed.

*Example 3*

The catalyst was prepared in the manner described in Example 2 but the active carbon which had been impregnated and then treated with hydrogen was admixed with 20 grams titanium carbide powder instead of with the boron carbide used in the preceding example. Phosgene was then passed directly over the catalyst. The reaction was initiated by a slight formation of carbon tetrachloride. Phosgene was introduced at a rate of flow of 0.54 l./h. for a period of 48 hours and at a temperature of 390° C. Carbon tetrachloride was obtained in a yield of 46.5%, calculated on phosgene.

*Example 4*

The catalyst was prepared in the manner described in Example 2 with the exception that after hydrogen reduction 30 grams silicon carbide powder were added in the place of boron carbide. Phosgene was then introduced and carbon tetrachloride commenced to form initially with strong formation of $SiCl_4$. Phosgene was introduced at a rate of flow of 0.41 l./h. for a period of 63 hours and at a temperature of 400° C. Carbon tetrachloride was obtained in a yield of 40.5%, calculated on phosgene.

*Example 5*

50 grams rod-shaped active carbon (about 3 mm. long and about 1.2 mm. in diameter) were mixed with 5 grams silicon carbide powder and subsequently wetted with an aqueous solution of 28 grams ammonium vanadate ($NH_4VO_3$) dissolved in 200 cc. water. The mixture so obtained was dried for about 5 hours at 130° C. and reduced in a slow current of hydrogen as described in Example 1 at a maximum temperature of 950° C. until traces of water did no longer appear at the end of the furnace. In the current of hydrogen, the temperature was reduced to room temperature, phosgene was then passed directly over the catalyst, and the whole was heated to a temperature of 390° C. Phosgene was passed over the catalyst for a period of 38 hours at a rate of 0.65 l./h. A total of 112.3 grams phosgene underwent reaction. Carbon tetrachloride was obtained in a yield of 4.6%, calculated on phosgene, while the remaining portion of phosgene left the reaction space undecomposed. It could be used again for further reaction.

*Example 6*

100 grams rod-shaped active carbon (about 3 mm. long and about 1.2 mm. in diameter) were mixed with 10 grams silicon carbide powder and then wetted with an aqueous solution of 130.5 grams $Na_2PtCl_6\cdot 6H_2O$ (dissolved in 200 cc. water). The mixture was then dried for about 5 hours at 130° C. and reduced in a current of hydrogen at a maximum temperature of 500° C. until water did no longer form. The whole was cooled in the hydrogen current to 390° C. and phosgene was passed over the catalyst for a period of about 39 hours at a rate of 0.81 l./h. A total of 125.3 grams phosgene was used. Carbon tetrachloride was obtained in a yield of 1.5% calculated on phosgene.

*Example 7*

100 grams rod-shaped active carbon (about 3 mm. long and about 1.2 mm. in diameter) were mixed with 10 grams silicon carbide powder and wetted with a hydrochloric acid solution of 100 grams $FeCl_3$ (dissolved in 200 cc. dilute hydrochloric acid). The mixture was dried for about 6 hours at 130° C. and reduced in a current of hydrogen at a maximum temperature of 920° C. until water did no longer form. The whole was then cooled in the hydrogen current to 390° C. and a total of 108.7 grams phosgene was passed over the catalyst for about 44 hours at a rate of 0.55 l./h. Carbon tetrachloride was obtained in a yield of 1.2% calculated on phosgene.

*Example 8*

100 grams rod-shaped active carbon (about 3 mm. long and about 1.2 mm. in diameter) were mixed with 10 grams silicon carbide powder and wetted with a nitric acid solution of 24 grams $NH_4VO_3$ and 23.5 grams rhenium metal (dissolved in 200 cc. concentrated nitric acid). The mixture was dried for about 6 hours at 140° C. and then reduced in a current of hydrogen at a maximum temperature of 1000° C. until traces of water did no longer appear at the end of the furnace. The whole was then cooled in the hydrogen current to room temperature, phosgene was passed over the catalyst and the mixture was heated to 390° C. Phosgene was introduced for a period of 34 hours at a rate of 0.88 l./h. A total of 136.4 grams phosgene was used. Carbon tetrachloride was obtained in a yield of 2.8% calculated on phosgene.

I claim:

1. A process for the manufacture of carbon tetrachloride, which comprises contacting phosgene with a catalyst combination consisting of at least one transition metal of groups V to VIII of the periodic table, at least one carbide of a member selected from the group consisting of boron, silicon and a transition metal of groups IV and V of the periodic table, and active carbon at a temperature between about 250° C. and about 600° C.

2. A process as claimed in claim 1, wherein the phosgene is used in admixture with at least one gas selected from the group consisting of nitrogen, carbon monoxide and chlorine.

3. A process as claimed in claim 1, wherein a mixture of carbon monoxide and chlorine is used instead of preformed phosgene.

4. A process as claimed in claim 1, wherein said catalyst combination is used in a finely divided state.

5. A process as claimed in claim 1, wherein at least one vaporous member selected from the group consisting of carbon disulfide and sulfur chloride is contacted with said catalyst combination before contacting it with phosgene.

6. A process for the manufacture of carbon tetrachloride, which comprises contacting a catalyst combination consisting of at least one transition metal of groups V to VIII of the periodic table, at least one carbide of a member selected from the group consisting of boron, silicon and a transition metal of groups IV and V of the periodic table, and active carbon with chlorine gas, then contacting said catalyst combination with a member selected from the group consisting of phosgene, a gas mixture containing phosgene and at least one gas from the group consisting of nitrogen, carbon monoxide and chlorine, and a gas mixture of carbon monoxide and chlorine at a temperature between about 250° C. and about 600° C.

References Cited in the file of this patent
UNITED STATES PATENTS 2,892,875     Kung  ---------------- June 30, 1959